Aug. 30, 1938.  C. H. RAINES ET AL  2,128,471
COMPASS SAW
Filed Nov. 22, 1937
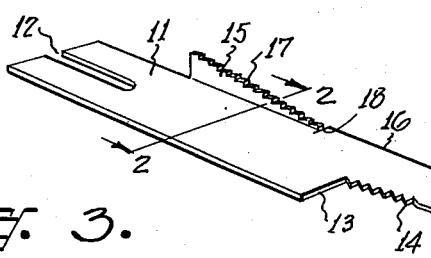
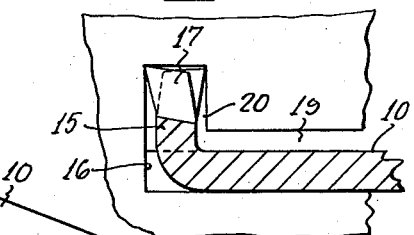
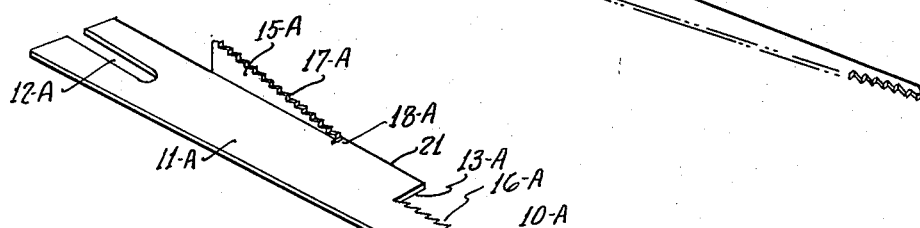
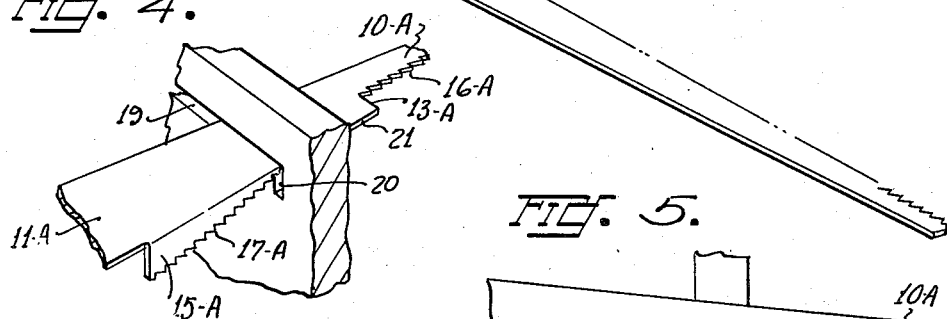
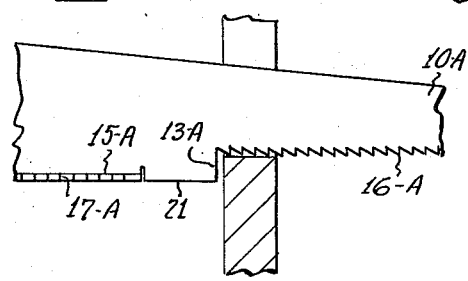
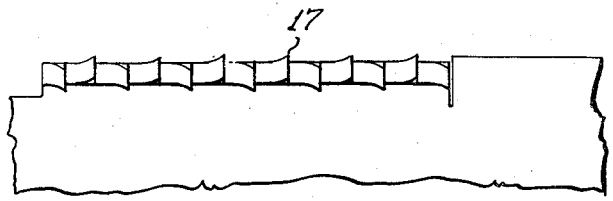
INVENTORS
C. H. RAINES
J. C. RAINES
BY
*C. W. Birkenbeuel.*
ATTORNEY.

Patented Aug. 30, 1938

2,128,471

UNITED STATES PATENT OFFICE 2,128,471

COMPASS SAW

Claude H. Raines, Portland, and James C. Raines, Lacomb, Oreg.

Application November 22, 1937, Serial No. 175,864

1 Claim. (Cl. 143—134)

This invention relates generally to cutting tools, and particularly to a compass saw for forming angular cuts.

The main object of this invention is the construction of an improved form of compass saw by means of which square holes may be sawed and in which one portion of the saw forms a guide for another portion thereof.

The second object is the provision of a saw of the class described in which two saws are mounted on one handle and are held in a fixed annular relationship and in which a guide is interposed between the adjacent ends of the sawing edges.

The third object is to so construct the saw that it will be easy to manufacture and maintain and that there will be no danger of mutilating the sides of the cut formed by one portion of the saw due to an excessive movement of the saw.

The fourth object is to provide a limiting stop which will prevent the joint action of two portions of the saw within the same cut.

These and other objects are accomplished in the manner set forth in the following specification as illustrated in the accompanying drawing, in which:

Fig. 1 is a perspective view showing a form of the device in which the auxiliary blade is formed along the back edge of the saw.

Fig. 2 is a fragmentary section taken along the line 2—2 in Fig. 1.

Fig. 3 is a perspective view of a blade showing an auxiliary cutting element formed along the same side of the blade as is the main cutting element.

Fig. 4 is a fragmentary view showing the manner in which the right angle cut is being formed in a board.

Fig. 5 is a fragmentary view showing the action of the stop.

Fig. 6 is a fragmentary plan of the auxiliary cutting element.

Similar numerals refer to similar parts throughout the several views.

Referring in detail to the drawing, there is shown in Figs. 1 and 2 a compass saw blade 10 whose shank 11 is provided with a slot 12 for attachment to a handle (not shown). The shank 11 is somewhat wider than is the main body of the blade 10 and is provided with a shoulder 13 which serves as a stop for limiting the sawing action of the teeth 14 on the blade 10.

In this form of the device, there is formed an auxiliary blade 15 along the back 16. The blade 15 is in this instance normal to the shank 11. The teeth 17 merge into the shank 11 at the point 18 which is nearer to the slot 12 than is the shoulder 13.

In the form of the device shown in Fig. 3, the blade 10—A is provided with teeth 16—A which terminate at the stop 13—A. In this form of the device the shank 11—A is provided with the auxiliary cutting blade 15—A whose teeth 17—A merge with the shank 11—A at the point 18—A which is spaced from the shoulder 13—A.

The two forms of the device are identical except that in the form shown in Figs. 1 and 2, the teeth of the two saws are on opposite edges of the blade 10 while in the form shown in Fig. 3 the two sets of cutting edges are on the same side of the saw.

When the saw, as shown in Fig. 1, is used, the cut is started by means of the teeth 14 and the movement of the blade 10 is limited by the shoulder 13. The saw is then taken out of the cut and turned so that the back 16 guides along the end of the cut 19 and as the saw is operated, the teeth 17 form the new cut 20 which is normal to the cut 19.

The action of the saw illustrated in Fig. 3 is identical except that the blade 10—A need not be withdrawn. It is merely necessary to move the teeth 16—A away from the end of the cut 19 far enough to pass the stop 13—A and permit the edge 21 to guide the saw while the teeth 17—A are forming their portion of the cut.

It can be seen that with this construction it is possible to form square holes in materials and that these operations may be performed quickly and accurately with a minimum amount of effort. Obviously, other angles may be formed for special purposes if desired, the square being merely illustrative.

Numerous attempts have been made to produce saws of this type, examples of which are shown in the patent of Weymar, No. 416,281, and Allen 72,582. These devices, however, never found their way onto the market for several reasons.

First, they were difficult to construct. Second, they were difficult to operate satisfactorily because of the fact that the cutting teeth of the auxiliary blade merged with the cutting teeth of the main blade, so that no guiding action for the auxiliary blade was obtained from the main blade. Furthermore, unless the operator was extremely careful, the auxiliary blade would continually mar the sides of the slot formed by the main blade. All of these defects are overcome by our present invention in which the guiding portions 21 or the portion of the back 16 which lies between the point 18 and the shoulder 13 serve to guide the saw at the commencement of the cut by the auxiliary teeth.

It will be clear that if the portions 16 and 21 were provided with teeth, they would no longer serve as guides since they would be sawing in one direction while the auxiliary teeth would be sawing in a direction normal thereto.

We claim:

A compass saw having a main blade provided with a stop between the ends thereof and having cutting teeth formed between said stop and the point of said blade, a guide formed on said saw extending from said stop away from the point of said saw and in parallelism with its cutting teeth and an auxiliary saw blade integral with said main blade and normal thereto having its cutting teeth merging into the end of said guide which is spaced from said stop.

CLAUDE H. RAINES.
JAMES C. RAINES.